United States Patent
Cao et al.

(10) Patent No.: US 10,769,383 B2
(45) Date of Patent: Sep. 8, 2020

(54) CLUSTER-BASED WORD VECTOR PROCESSING METHOD, DEVICE, AND APPARATUS

(71) Applicant: ALIBABA GROUP HOLDING LIMITED, Grand Cayman (KY)

(72) Inventors: Shaosheng Cao, Hangzhou (CN); Xinxing Yang, Hangzhou (CN); Jun Zhou, Hangzhou (CN); Xiaolong Li, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 0 days.

(21) Appl. No.: 16/743,224

(22) Filed: Jan. 15, 2020

(65) Prior Publication Data

US 2020/0151395 A1 May 14, 2020

Related U.S. Application Data

(63) Continuation of application No. PCT/CN2018/101053, filed on Aug. 17, 2018.

(30) Foreign Application Priority Data

Oct. 23, 2017 (CN) .......................... 2017 1 0992297

(51) Int. Cl.
*G06F 17/28* (2006.01)
*G06N 3/02* (2006.01)
(Continued)

(52) U.S. Cl.
CPC .............. *G06F 40/30* (2020.01); *G06F 40/40* (2020.01); *G06N 3/08* (2013.01)

(58) Field of Classification Search
None
See application file for complete search history.

(56) References Cited

U.S. PATENT DOCUMENTS

| 5,233,681 A | 8/1993 | Bahl et al. |
| 5,317,507 A | 5/1994 | Gallant |

(Continued)

FOREIGN PATENT DOCUMENTS

| CN | 105095444 A | 11/2015 |
| CN | 105786782 A | 7/2016 |

(Continued)

OTHER PUBLICATIONS

Collobert, Ronan, and Jason Weston. "A unified architecture for natural language processing: Deep neural networks with multitask learning." Proceedings of the 25th international conference on Machine learning (Year: 2008).*

(Continued)

*Primary Examiner* — Seong-Ah A Shin
(74) *Attorney, Agent, or Firm* — Sheppard Mullin Richter & Hampton LLP

(57) ABSTRACT

Embodiments of the present application disclose a cluster-based word vector processing method, apparatus, and device. Solutions are include: in a cluster having a server cluster and a worker computer cluster, in which each worker computer in the worker computer cluster separately reads some corpuses in parallel, extracts a word and context words of the word from the read corpuses, obtains corresponding word vectors from a server in the server cluster, and trains the corresponding word vectors, and the server cluster updates word vectors of same words that are stored before the training according to training results of one or more respective worker computers with respect to the word vectors of the same words.

15 Claims, 4 Drawing Sheets

(51) Int. Cl.
*G06N 3/08* (2006.01)
*G06F 40/30* (2020.01)
*G06F 40/40* (2020.01)

(56) References Cited

U.S. PATENT DOCUMENTS

| | | | |
|---|---|---|---|
| 5,325,298 | A | 6/1994 | Gallant |
| 5,619,709 | A | 4/1997 | Caid et al. |
| 5,828,999 | A | 10/1998 | Bellegarda et al. |
| 6,137,911 | A | 10/2000 | Zhilyaev |
| 6,317,707 | B1 | 11/2001 | Bangalore et al. |
| 7,007,069 | B2 | 2/2006 | Newman et al. |
| 7,251,637 | B1 | 7/2007 | Caid et al. |
| 7,280,957 | B2 | 10/2007 | Newman et al. |
| 7,340,674 | B2 | 3/2008 | Newman |
| 7,877,258 | B1 | 1/2011 | Chelba et al. |
| 8,027,938 | B1* | 9/2011 | Xu .................. G06N 20/00 706/12 |
| 8,032,448 | B2 | 10/2011 | Anderson et al. |
| 8,204,737 | B2 | 6/2012 | Suominen |
| 8,488,916 | B2 | 7/2013 | Terman |
| 8,612,203 | B2 | 12/2013 | Foster et al. |
| 8,719,257 | B2 | 5/2014 | Rangan |
| 9,600,568 | B2 | 3/2017 | Rangan |
| 9,830,378 | B2 | 11/2017 | Stockton et al. |
| 10,083,176 | B1 | 9/2018 | Desai et al. |
| 2003/0074368 | A1 | 4/2003 | Schuetze et al. |
| 2003/0130998 | A1 | 7/2003 | Fox et al. |
| 2005/0165556 | A1 | 7/2005 | Barnhill et al. |
| 2008/0109454 | A1 | 5/2008 | Willse et al. |
| 2014/0229158 | A1* | 8/2014 | Zweig .................. G06N 3/08 704/9 |
| 2015/0220833 | A1* | 8/2015 | Le .................. G06F 16/583 706/16 |
| 2016/0019471 | A1 | 1/2016 | Shin et al. |
| 2016/0070748 | A1* | 3/2016 | Firat .................. G06F 16/2425 707/730 |
| 2016/0350288 | A1* | 12/2016 | Wick .................. G06F 40/242 |
| 2017/0139899 | A1* | 5/2017 | Zhao .................. G06F 40/284 |
| 2017/0300828 | A1* | 10/2017 | Feng .................. G06N 20/00 |
| 2017/0372694 | A1* | 12/2017 | Ushio .................. G06N 3/084 |
| 2018/0075324 | A1 | 3/2018 | Kaji |
| 2018/0182376 | A1* | 6/2018 | Van Gysel .......... G10L 15/16 |
| 2018/0336183 | A1* | 11/2018 | Lee .................. G06F 40/30 |
| 2018/0336241 | A1* | 11/2018 | Noh .................. G06F 16/242 |
| 2019/0019055 | A1 | 1/2019 | Zhou et al. |
| 2019/0050743 | A1* | 2/2019 | Chen .................. G06N 20/00 |
| 2019/0370394 | A1* | 12/2019 | Li .................. G06F 16/335 |

FOREIGN PATENT DOCUMENTS

| | | |
|---|---|---|
| CN | 106802888 A | 6/2017 |
| CN | 106897265 A | 6/2017 |
| CN | 107102981 A | 8/2017 |
| CN | 107239443 A | 10/2017 |
| CN | 107247704 A | 10/2017 |
| CN | 107273355 A | 10/2017 |
| CN | 107957989 A | 4/2018 |
| CN | 108170663 A | 6/2018 |
| TW | 201732651 A | 9/2017 |

OTHER PUBLICATIONS

Mikolov, Tomas, etal. "Efficient estimation of word representations in vector space." arXiv preprint arXiv:1301.3781 (Year: 2013).*
Lai, Siwei, etal. "Recurrent convolutional neural networks for text classification." Twenty-ninth AAAI conference on artificial intelligence (Year: 2015).*
Yu, Jinxing, etal. "Joint embeddings of Chinese words, characters, and fine-grained subcharacter components." Proceedings of the 2017 Conference on Empirical Methods in Natural Language Processing (Year: 2017).*
First Search Report for Chinese Application No. 201710992297.8, dated Jan. 15, 2020, 1 page.
First Search Report for Taiwanese Application No. 107129401, dated Jul. 8, 2019, 1 page.
International Search Report and Written Opinion of the International Searching Authority for International Application No. PCT/CN2018/101053, dated Nov. 20, 2018, with partial machine English translation, 9 pages.
First Search Report for Chinese Application No. 201711123278.8, dated Jan. 22, 2020, 2 pages.
First Office Action for Chinese Application No. 201711123278.8, dated Feb. 6, 2020, 15 pages.
First Search Report for Taiwanese Application No. 107131853, dated Jun. 21, 2019, 1 page.
International Search Report and Written Opinion of the International Searching Authority for International Application No. PCT/CN2018/105959, dated Dec. 20, 2018, with partial machine English translation, 10 pages.
Preinterview first office action for U.S. Appl. No. 16/776,456 dated Apr. 15, 2020.
Lian et al., "Asynchronous Parallel Stochastic Gradient for Nonconvex Optimization," Advances in Neural Information Processing Systems 28 (NIPS 2015), 2015, pp. 1-9 (Year: 2015).
Goldberg et al., "word2vec Explained: deriving Mikolov et al.'s negative-sampling word-embedding method," 2014 (accessible at "https://arxiv.org/abs/1402.3722," last accessed Apr. 10, 2020) (Year: 2014).
International Preliminary Report on Patentability Chapter I for PCT Application No. PCT/CN2018/105959 dated May 28, 2020.
First action interview—office action for U.S. Appl. No. 16/776,456 dated Jun. 4, 2020.
International Preliminary Report on Patentability Chapter I for PCT Application No. PCT/CN2018/101053 dated May 7, 2020.

* cited by examiner and update module updates word vectors of same words according to training results of one or more of the worker computers with respect to the word vectors of the same words.

CLUSTER-BASED WORD VECTOR PROCESSING METHOD, DEVICE, AND APPARATUS

CROSS REFERENCE TO RELATED APPLICATIONS

This application is a continuation application of International Application No. PCT/CN2018/101053, filed on Aug. 17, 2018, which claims priority to and benefits of Chinese Patent Application No. 201710992297.8 filed on Oct. 23, 2017. The contents of the above-referenced applications are incorporated herein by reference in their entirety.

TECHNICAL FIELD

The present application relates to the field of computer software technologies, and in particular, to a cluster-based word vector processing method, apparatus, and device.

BACKGROUND

Most of today's natural language processing solutions use neural network-based architectures. An important underlying technology in such an architecture is word vectors. A word vector maps a word to a fixed dimension, and the vector represents semantic information of the word.

In the existing technologies, common algorithms for generating word vectors, such as Google's word vector algorithm and Microsoft's deep neural network algorithm, often run on a single computer.

Based on the existing technologies, an efficient large-scale word vector training solutions is needed.

SUMMARY

Embodiments of the present application provide a cluster-based word vector processing method, apparatus, and device, to resolve the following technical problem: an efficient large-scale word vector training solution is needed.

To resolve the foregoing technical problem, the embodiments of the present application are implemented as follows:

An embodiment of the present application provides a cluster-based word vector processing method, where the cluster includes a plurality of worker computers. The method includes operations performed by each of the worker computers: obtaining a word and at least one context word of the word that are extracted from a portion of a language corpus; obtaining word vectors for the word and the at least one context word; training the word vectors according to the word and the at least one context word to generate training results; and forwarding to a server cluster the training results to enable the server cluster to update the word vectors for the word and the at least one context word based on the training results.

An embodiment of the present application provides a cluster-based word vector processing apparatus at a cluster. The cluster includes a plurality of worker computers, and the apparatus includes an integration and update module, and a training module that is located in each of the worker computers. The training module of each of the worker computers separately performs the following operations: obtaining a word and at least one context word of the word that are extracted from a language corpus; obtaining word vectors for the word and the at least one context word; and training the word vectors according to the word and the at least one context word. The integration and update module updates word vectors of same words according to training results of one or more of the worker computers with respect to the word vectors of the same words.

An embodiment of the present application provides a cluster-based word vector processing device. The device belongs to the cluster, and includes at least one processor and a memory in communication connection with the at least one processor. The memory stores an instruction executable by the at least one processor to cause the at least one processor to: obtain a word and at least one context word of the word that are extracted from a language corpus; obtain word vectors for the word and the at least one context word; train the word vectors according to the word and the at least one context word; and update word vectors of same words according to one or more respective training results of the word vectors of the same words.

An embodiment of the present application provides a cluster comprising a server cluster and a worker-computer cluster including a plurality of worker computers. Each of the worker computers is configured to perform operations including: obtaining a word and at least one context word of the word that are extracted from a corpus; obtaining word vectors for the word and the at least one context word of the word; training the word vectors according to the word and the context words to generate training results; and forwarding to the server cluster the training results to enable the server cluster to update the word vectors of the word and the at least one context word based on the training results.

An embodiment of the present application provides a non-transitory computer-readable storage medium. The non-transitory computer-readable storage medium stores instructions executable by one or more processors to cause the one or more processors to perform operations at a cluster comprising a worker computer cluster including a plurality of worker computers and a server cluster. The operations at each of worker computers include obtaining a word and at least one context word of the word that are extracted from a corpus; obtaining word vectors for the word and the at least one context word; training the word vectors according to the word and the at least one context word to generate training results; and forwarding to the server cluster the training results to enable the server cluster to update the word vectors of the word and the at least one context word based on the training results. The operations at the server cluster includes updating word vectors of same words according to training results obtained from one or more of the worker computers with respect to word vectors of the same words.

The foregoing at least one technical solution used in the embodiments of the present application can achieve the following beneficial effect: a distributed parallel processing capability of a cluster enables the solution to be applicable to large-scale word vector training and efficiency is relatively high.

BRIEF DESCRIPTION OF THE DRAWINGS

To describe the technical solutions in the embodiments of this specification or in the prior art more clearly, the following briefly introduces the accompanying drawings required for describing the embodiments or the prior art. Apparently, the accompanying drawings in the following description show merely some embodiments of this specification, and a person of ordinary skill in the art may still derive other drawings from these accompanying drawings without creative efforts.

DETAILED DESCRIPTION OF EMBODIMENTS

Embodiments of the present application provide a cluster-based word vector processing method, apparatus, and device.

To enable a person skilled in the art to better understand the technical solutions in this specification, the technical solutions of the embodiments of this specification will be described clearly and thoroughly below with reference to the accompanying drawings of the embodiments of this specification. Apparently, the described embodiments are merely some rather than all of the embodiments of this application. All other embodiments obtained by a person of ordinary skill in the art based on the embodiments of this specification without creative efforts shall fall within the protection scope of the present invention.

The solutions in the present application are applicable to a cluster, and efficiency in processing large-scale word vectors in the cluster is higher. Specifically, training corpuses may be divided. In a distributing training solution, a plurality of worker computers in the cluster can separately train word vectors corresponding to a language corpus. Because each portion of the language corpus may include same words, respective training results of word vectors of the same words by the worker computers can be integrated, to help further update the word vectors of the same words that have been stored before the training.

The solutions may involve one or more clusters. For example, in FIG. 1, the solutions involve two clusters.

Figure 1:
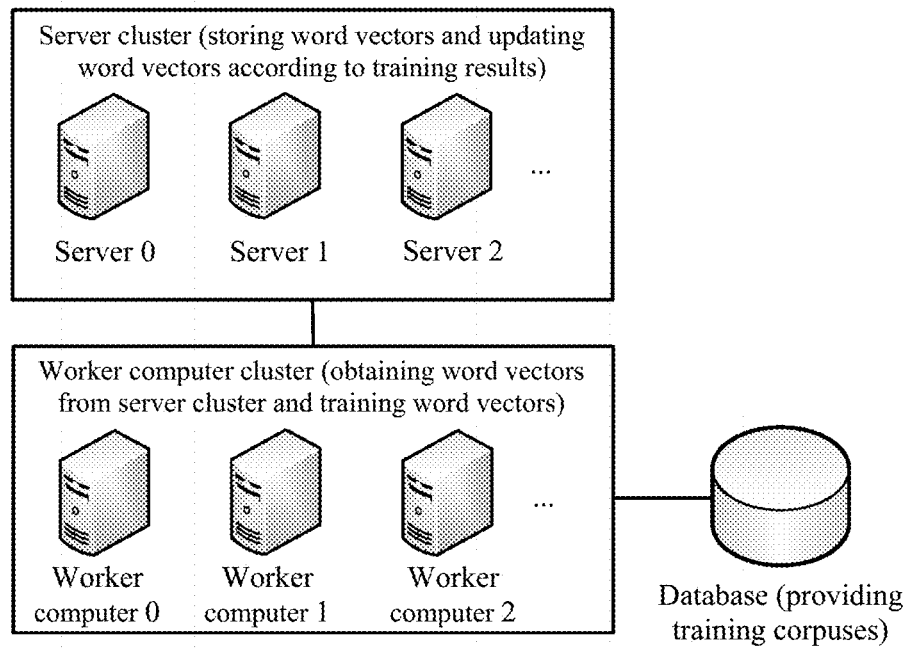
FIG. 1 is a schematic diagram of an overall architecture of a cluster, according to embodiments of the present application.

FIG. 1 is a schematic diagram of an overall architecture of a cluster involved in an actual application scenario, according to a solution of the present application. The overall architecture includes three parts: a server cluster, a worker computer cluster, and a database. The database stores language corpuses used for training, for the worker computer cluster to read. The server cluster stores original word vectors, and the worker computer cluster cooperates with the server cluster to train word vectors and update the word vectors in the server cluster according to training results.

The architecture in FIG. 1 is a non-limiting example. For example, the solution may alternatively involve only one cluster, or the cluster includes at least one scheduler and a plurality of worker computers, and the scheduler completes the work of the foregoing server cluster. As another example, the solution may alternatively or additionally involve one worker computer cluster and one server, and so on.

The following describes the solutions of the present application in detail.

Figure 2:
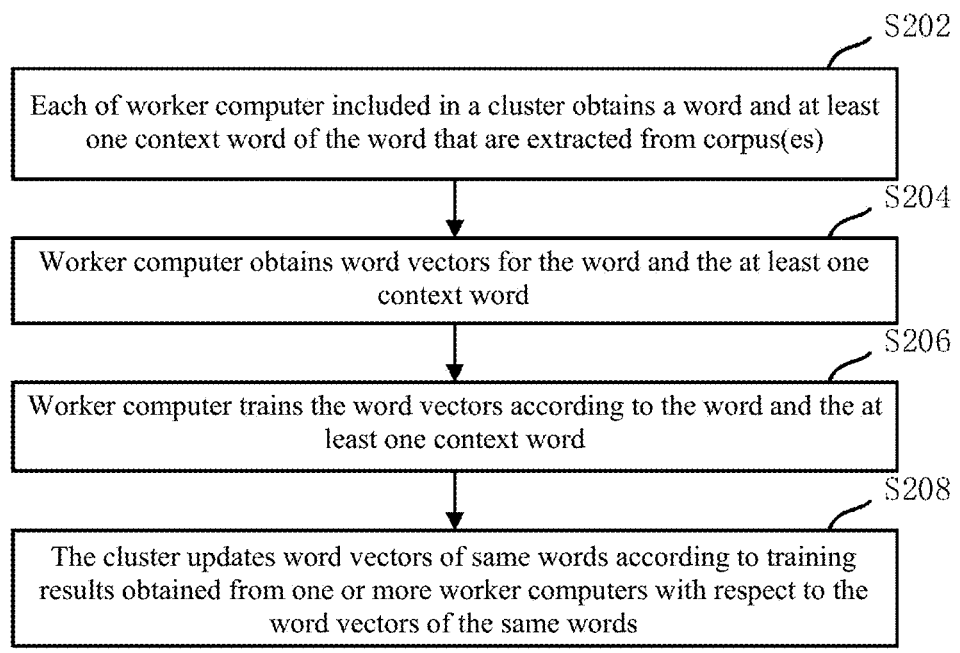
FIG. 2 is a flowchart of a cluster-based word vector processing method, according to an embodiment of the present application.

FIG. 2 is a flowchart of a cluster-based word vector processing method, according to an embodiment of the present application. A cluster includes a plurality of worker computers. Some operations in FIG. 2 are performed by at least one computer (or a program on a computer) in the cluster, and different operations may be performed by different execution entities. The operations in FIG. 2 may be performed a plurality of rounds, and a different group of corpuses may be used in each round.

The procedure in FIG. 2 includes the following operations:

In S202, each of the worker computers included in the cluster separately obtains a word and at least one context word of the word that are extracted from a language corpus.

In S204, each of the worker computers obtains word vectors for the word and the at least one context word of the word.

In S206, each of the worker computers trains the word vectors according to the word and the at least one context word of the word to generate training results. Each of the worker computers can also forward to a server cluster the training results to enable the server cluster to update word vectors of same words based on the training results.

In S208: The cluster updates word vectors of same words according to training results of one or more of the worker computers with respect to the word vectors of the same words.

In the present embodiment, each worker computer may perform operations S202 to S206 in parallel. Each worker computer usually corresponds to some different corpuses. In this case, large-scale training of corpuses can be efficiently used, and word vector training efficiency can also be improved. For example, corpuses or a corpus currently used for training word vectors may be divided into a plurality of parts. Each worker computer may read one part, and then perform operations S202 to S206 based on the part of the corpuses read by the worker computer.

For explanation, operations S202 to S204 are described mainly from a perspective of a particular worker computer in the following embodiments.

In an embodiment of the present application, if a current round of operations is the first round of operations, the word vectors obtained in operation S204 may be obtained through initialization. For example, a word vector of each word and a word vector of a context word of the word may be initialized randomly or according to a specified probability distribution. The specified probability distribution may be, for example, a distribution between 0 and 1. If the current round of operations is not the first round of operations, the word vectors obtained in operation S204 may be word vectors that are updated and stored after a previous round of operations is performed.

In an embodiment of the present application, generally, operation S208 may be performed by a server cluster other than a worker computer cluster, or performed by a scheduler or a server that belongs to a same cluster as the worker computers, to reduce the load of the worker computers. Correspondingly, the updated word vectors may be stored in the server or server cluster, for use in a next round of operations.

The rest can be deduced by analogy. After a plurality of rounds of operations is performed until all groups of training corpuses are used, final word vectors obtained through updating may be written into a database, for use in various scenarios that require the word vectors, or may still be stored in the cluster.

Based on the method in FIG. 2, a distributed parallel processing of the cluster is applicable to large-scale word vector training, and efficiency is relatively high. In addition, the method enables large-scale training data to be used with efficiency.

Based on the method in FIG. 2, the present embodiment further provides some specific implementation solutions of the method and expanded solutions. The architecture in FIG. 1 is used as an example below for description.

In one embodiment of the present application, based on the architecture in FIG. 1, the cluster described in FIG. 2 includes a server cluster and a worker computer cluster, the worker computer cluster performs operations S202 to S206, and the server cluster performs operation S208.

The architecture in FIG. 1 may alternatively be referred to as a parameter server, and the parameter server can be used to meet parallel processing requirements: parallel data processing and parallel model processing. Parallel data processing means that each computer loads different training data and synchronizes model training. Global information may be synchronized at regular intervals. Parallel model processing means that each computer loads some model parameters, and model parameters loaded on all computers are put together as a full amount of model parameters.

The server cluster mainly implements parallel model processing. That is, the server cluster maintains a full amount of model parameters in a memory, while the worker computer cluster reads different training data for training in parallel. An entire process is as follows: The server cluster distributes parameters to the worker computer cluster (each worker computer may read the full amount of model parameters, or may read only some of the model parameters). Each worker computer reads different training data, starts parallel training, and updates model parameters in each worker computer. The worker computer cluster transmits trained model parameters back to the server cluster. The server cluster aggregates all updated data, and updates a model, and then transmits new model parameters to the worker computer cluster. This process is repeated, until all training data is trained, or a maximum quantity of training times is reached. In terms of the specific scenario of the present application, the foregoing training data may be a corpus, and the model parameters may be a word vector.

In the present embodiment of the present application, extracting a word and at least one context word of the word may be performed by a worker computer, or may be performed in advance by another device. For example, in the former manner, before operation S202 of obtaining a word and at least one context word of the word that are extracted from a language corpus or corpuses, each of the worker computers may obtain a language corpus through distributed reading. If the corpuses are stored in the database, the corpuses may be read from the database.

In the present embodiment of the present application, the obtaining a word and at least one context word of the word that are extracted from a language corpus may include: creating a corresponding word pair according to the corpus obtained through reading, where the word pair includes a current word and a context word of the current word. For example, a word in the corpus obtained through reading may be scanned (a current word) and denoted as w. A sliding window including w is determined according to a specified sliding window distance. Each of the other words in the sliding window may be used as a context word of w and denoted as c.

In this way, a word pair {w,c} is formed.

Further, it is assumed that word vectors are stored in a plurality of servers included in the server cluster. In this case, operation S204 of obtaining word vectors of the word and the at least one context word of the word may include: obtaining a current word set and a context word set through extraction according to the created word pair; and obtaining word vectors of words included in the current word set and the context word set from one of the servers. Certainly, this is not a unique implementation. For example, a word vector of a currently scanned word may be obtained from the server when the corpus is scanned, and the created word pair may not need to be relied on.

In the present embodiment of the present application, the corresponding word vectors may be trained according to a designated loss function and the created word pair.

To obtain a better training effect and achieve faster convergence, training may further be performed in combination with a designated negative sample word. A negative sample word has a lower correlation with the corresponding current word than the context word, and generally, several negative sample words may be randomly selected from all words. In such a case, S206 of training the corresponding word vectors according to the word and the at least one context word of the word may include: training the corresponding word vectors according to the designated loss function, the designated negative sample word, and the created word pair. The current word and each negative sample word may also constitute a word pair. Assuming that there are $\lambda$ negative sample words, the corresponding word pairs may be denoted as $\{w,c_1'\}$, $\{w,c_2'\}$, and $\{w,c_\lambda'\}$. For ease of description, the negative sample word pairs and the foregoing context word pairs are collectively denoted as $\{w,c\}$. A variable y may be used for distinguishing these two types of word pairs. For a context word pair, y=1, and for a negative sample word pair, Y=0.

For ease of understanding, an example of the loss function is provided as follows:

$$L(w,c)=\log \sigma(\vec{w}\cdot\vec{c})+\lambda E_{c'\sim P(D)}[-\log \sigma(\vec{w}\cdot\vec{c}\,')],$$

where L(w,c) represents the loss function, c' represents the negative sample word, $\vec{w}$ represents a word vector of w, $\vec{c}$ represents a word vector of c, $\vec{c}'$ represents a word vector of c', $\lambda$ is a quantity of negative sample words of w, and $\sigma$ is an activation function, such as a sigmoid function.

Certainly, in addition to the foregoing example, the loss function may alternatively be implemented in other forms. A training target is to make a similarity of $\vec{w}$ and $\vec{c}$ as great as possible, and a similarity of $\vec{w}$ and $\vec{c}'$, as small as possible. In the foregoing example, the similarity is measured through vector point multiplication, and the similarity may alternatively be measured in another manner.

Further, if the word vectors are trained by using a gradient descent method, the training the corresponding word vectors according to a designated loss function, a designated negative sample word, and the created word pair may include: traversing the corpus to obtain a current word one-by-one (current words); and according to the designated loss function, the designated negative sample word, and the created word pair, calculating a gradient according to the designated loss function, the designated negative sample word, and the created word pair, and iteratively updating word vectors of traversed current words and context words of the current words according to the gradient.

In an actual application, one or more threads on each worker computer may iteratively update the word vectors of the traversed current words and context words of the current words in a manner of asynchronous calculation without locking. Therefore, the threads on each worker computer may also perform updating in parallel without interfering with each other, thereby further improving training efficiency.

In the present embodiment of the present application, the gradient and the training results may vary with different loss functions and different activation functions. The foregoing example of the loss function is still used to describe calculation during training.

Calculating a gradient according to the designated loss function, the designated negative sample word, and the created word pair, and iteratively updating word vectors of traversed current words and context words of the current words according to the gradient may include: iteratively updating the word vectors of the traversed current words and context words of the current words according to the following formulas:

$$\vec{w}_{i,t+1} = \vec{w}_{i,t} + g\vec{c}_{i,t}, w \in B_{i,k} \quad \text{(formula 1) and}$$

$$\vec{c}_{i,t+1} = \vec{c}_{i,t} + g\vec{w}_{i,t}, c \in \Gamma(w) \quad \text{(formula 2),}$$

where $$g = \alpha(y - \sigma(\vec{w} \cdot \vec{c})), \ y = \begin{cases} 1, \{w, c\} \\ 0, \{w, c'\} \end{cases},$$

w represents the current word, c represents the context word of w, c' represents the negative sample word, $\vec{w}$ represents the word vector of w, $\vec{c}$ represents the word vector of c, $\vec{w}_{i,t}$ and $\vec{c}_{i,t}$ represent a $i^{th}$ update on an $i^{th}$ worker computer, $B_{i,k}$ represents a $k^{th}$ corpus on the $i^{th}$ worker computer, $\Gamma(w)$ represents the context word set of w, α represents a learning rate, and for example, may be set to 0.025, and σ is a sigmoid function, namely, $$\sigma = \frac{1}{1+e^{-x}}.$$

Further, calculation of the gradient is described as follows:

$$\text{if } \nabla \sigma(z)|_z = \frac{1}{\sigma(z)} \cdot \sigma(z) \cdot (1 - \sigma(z)) = 1 - \sigma(z) \text{ and}$$

$$\nabla \sigma(-z)|_z = -(1 - \sigma(-z)) = -\sigma(z),$$

$$\nabla L(w, c)|_{\vec{w}} = (y - \sigma(\vec{w} \cdot \vec{c}))\vec{c} \text{ and}$$

$$\nabla L(w, c)|_{\vec{c}} = (y - \sigma(\vec{w} \cdot \vec{c}))\vec{w}.$$

In the present embodiment of the present application, when the server updates the word vectors according to the training results, operation S208 of updating word vectors of same words according to training results of one or more of the worker computers with respect to the word vectors of the same words may include: obtaining, by the server, the training results of one or more of the worker computers with respect to the word vectors of the same words; and performing average calculation according to the training results and the word vectors of the same words that are stored before the training, to obtain vector increment values, and updating the word vectors of the same words according to the vector increment values.

The update process is a model averaging process. The average calculation may be implemented in a plurality of manners. For example, a quantity of occurrences of a word on each worker computer is used as a weight to average the training results of a worker computer. Further, the training results of the worker computers may be averaged directly, and so on. The former manner is used as an example, and the foregoing vector increment values may be obtained through calculation according to the following formula:

$$\Delta(\vec{w}) = \frac{\sum_{i=0}^{l} \lambda_i(w)(\vec{w}_{i,T} - \vec{w}_{srv})}{\sum_{i=0}^{l} \lambda_i(w)} \text{ and} \quad \text{(formula 3)}$$

$$\Delta(\vec{c}) = \frac{\sum_{i=0}^{l} \lambda_i(c)(\vec{c}_{i,T} - \vec{w}_{srv})}{\sum_{i=0}^{l} \lambda_i(c)}, \quad \text{(formula 4)}$$

$\vec{w}_{i,T}$ and $\vec{c}_{i,T}$ represent an iterative update result on an $i^{th}$ worker computer, $\lambda_i(w)$ represents a quantity of occurrences of w on the $i^{th}$ worker computer, and $\vec{w}_{srv}$ represents $\vec{w}$ stored by a server before the training.

A word vector before the update and the calculated corresponding vector increment value are added to obtain an updated word vector.

Figure 3:
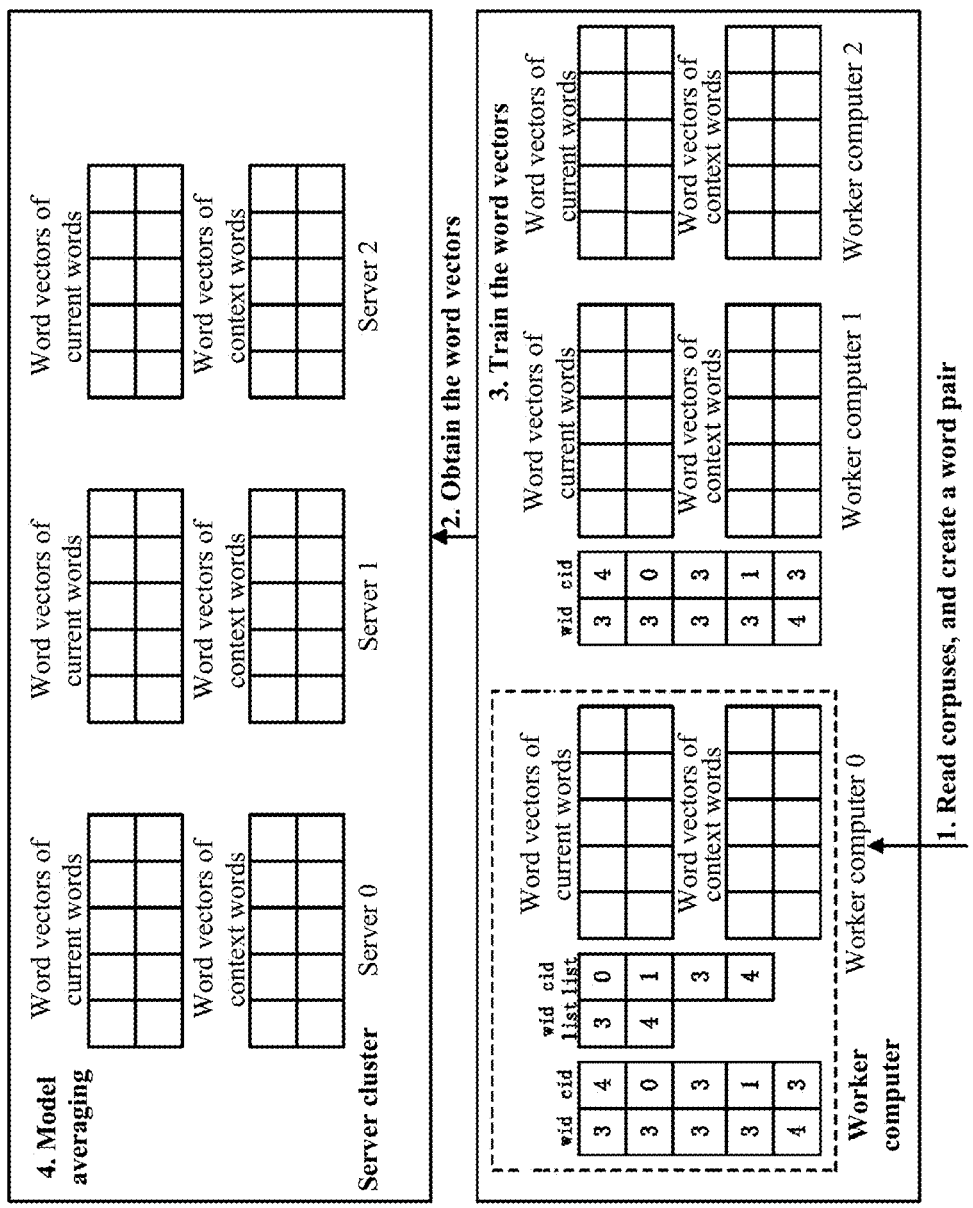
FIG. 3 is a schematic diagram of a cluster-based word vector processing method, according to an embodiment of the present application.

According to the foregoing description, an embodiment of the present application further provides a cluster-based word vector processing method in an actual application scenario, as shown in FIG. 3. Further, FIG. 4 is a flow chart illustrating a cluster-based word vector processing method corresponding to FIG. 3, according to an example embodiment.

FIG. 3 shows worker computers 0 to 2 and servers 0 to 2. Description provided for the worker computer 0 may also be applied to worker computers 1 and 2. Work modes of the worker computers 1 and 2 are consistent with a work mode of the worker computer 0. "wid" and "cid" are identifiers and respectively represent the current words and the context words. "wid list" and "cid list" are lists of identifiers and respectively represent the current word set and the context word set. A brief work operations in FIG. 3 includes: each worker computer reads in a distributed manner a corpus or corpuses and creates a word pair. Each worker computer obtains corresponding word vectors from the server cluster. Each worker computer trains the word vectors using the portion of the corpus or corpuses. The server cluster performs model averaging according to training results of the worker computers.

Figure 4:
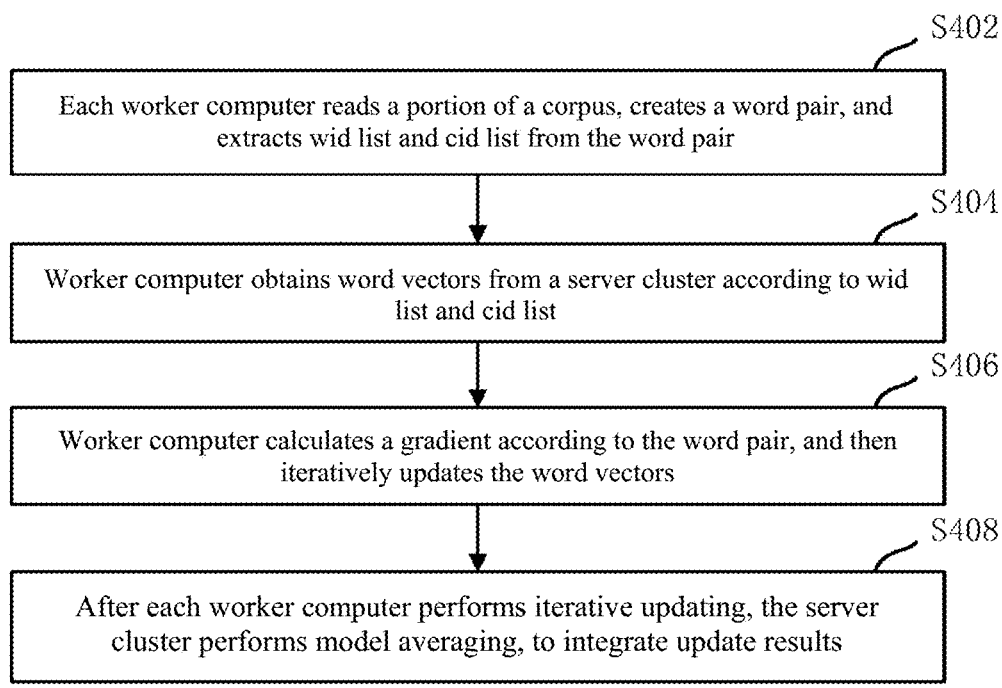
FIG. 4 is a flowchart of a cluster-based word vector processing method corresponding to FIG. 3, according to an embodiment of the present application.

FIG. 4 shows more detailed operations, which include the following operations.

In S402, a worker computer reads in a distributed manner a language corpus, creates a word pair {w,c}, and extracts wid list and cid list from the word pair, as shown in FIG. 3 at the worker computer 0.

In S404, the worker computer obtains corresponding word vectors from the server cluster according to wid list and cid list.

In S406, the worker computer calculates a gradient according to the word pair, then iteratively updates the word vectors using the foregoing formula 1 and formula 2.

In S408, after each worker computer performs iterative updating, the server cluster performs model averaging, to integrate the update results, and performs calculation using the foregoing formula 3 and formula 4.

Figure 5:
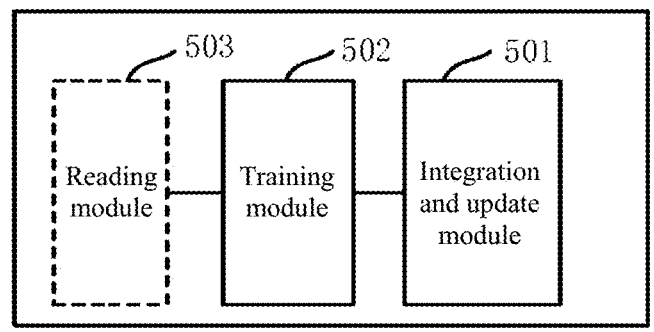
FIG. 5 is a schematic structural diagram of a cluster-based word vector processing apparatus corresponding to FIG. 2, according to an embodiment of the present application.

Based on a same idea, an embodiment of the present application further provides an apparatus corresponding to the foregoing method, as shown in FIG. 5.

FIG. 5 is a schematic structural diagram of a cluster-based word vector processing apparatus corresponding to FIG. 2, according to an embodiment of the present application. The cluster includes a plurality of worker computers. The apparatus is located in the cluster and includes an integration and update module 501 and a training module 502 that is located in a worker computer.

The training module 502 of each of the worker computers performs the following operations: obtaining a word and at least one context word of the word that are extracted from a language corpus; obtaining word vectors of the word and the at least one context word of the word; and training the word vectors according to the word and the at least one context word of the word to generate training results.

The integration and update module 501 updates word vectors of same words according to training results of one or more of the worker computers with respect to the word vectors of the same words.

In some embodiments, a worker computer further includes a reading module 503. Before the training module 502 obtains the word and the at least one context word of the word that are extracted from the a language corpus, the reading module 503 of each of the worker computers obtains the a language corpus through distributed reading.

The training module 502 obtains the word and the at least one context word of the word that are extracted from the a language corpus by creating a word pair according to the portion of the corpus obtained by the reading module 503 of the worker computer in which the training module 502 is located. The word pair includes a current word and a context word of the current word.

In some embodiments, the cluster further includes a plurality of servers. The training module 502 obtains the word vectors of the word and the context word of the word by obtaining a current word set and a context word set through extraction according to each word pair created by the training module 502; and obtaining word vectors of words included in the current word set and the context word set from a server.

In some embodiments, the training module 502 trains the corresponding word vectors according to the word and the at least one context word of the word by: training the corresponding word vectors according to a designated loss function, a designated negative sample word, and each word pair created by the training module 502.

In some embodiments, the training module 502 trains the word vectors according to the designated loss function, the designated negative sample word, and each word pair created by the training module 502 by: traversing the corpus obtained through reading; and calculating a gradient according to the designated loss function, the designated negative sample word, and each word pair created by the training module 502, and iteratively updating word vectors of traversed current words and context words of the current words according to the gradient.

In some embodiments, the training module 502 calculates the gradient according to the designated loss function, the designated negative sample word, and each word pair created by the training module 502, and iteratively updates the word vectors of the traversed current words and context words of the current words according to the gradient by: iteratively updating the word vectors of the traversed current words and context words of the current words according to the following formulas:

$$\vec{w}_{i,t+1} = \vec{w}_{i,t} + g\vec{c}_{i,t}, w \in B_{i,k} \text{ and}$$

$$\vec{c}_{i,t+1} = \vec{c}_{i,t} + g\vec{w}_{i,t}, c \in \Gamma(w),$$

where $$g = \alpha(y - \sigma(\vec{w} \cdot \vec{c})), y = \begin{cases} 1, \{w, c\} \\ 0, \{w, c'\} \end{cases},$$

w represents the current word, c represents the context word of w, c' represents the negative sample word, $\vec{w}$ represents the word vector of w, $\vec{c}$ represents the word vector of c, $\vec{w}_{i,t}$ and $\vec{c}_{i,t}$ represent a $i^{th}$ update on an $i^{th}$ worker computer, $B_{i,k}$ represents a $k^{th}$ corpus on the $i^{th}$ worker computer, $\Gamma(w)$ represents the context word set of w, α represents a learning rate, and σ is a sigmoid function.

In some embodiments, the training module 502 iteratively updates the word vectors of the traversed current words and context words of the current words by: iteratively updating, using one or more threads on a respective worker computer, the word vectors of the traversed current words and context words of the current words using asynchronous calculation without locking.

In some embodiments, the integration and update module 501 is located in the server. The integration and update module 501 updates the word vectors of the same words according to the training results of one or more of the worker computers with respect to the word vectors of the same words by the worker computer by: obtaining the training results from one or more of the worker computers with respect to the word vectors of the same words; and performing average calculation according to the training results and the word vectors of the same words that are stored before the training, to obtain vector increment values, and updating the word vectors of the same words according to the vector increment values.

In some embodiments, the integration and update module 501 performs average calculation according to the training results and the word vectors of the same words that are stored before the training, to obtain the vector increment values by: obtaining the vector increment value through calculation according to the following formulas:

$$\Delta(\vec{w}) = \frac{\sum_{i=0}^{l} \lambda_i(w)(\vec{w}_{i,T} - \vec{w}_{srv})}{\sum_{i=0}^{l} \lambda_i(w)} \text{ and}$$

$$\Delta(\vec{c}) = \frac{\sum_{i=0}^{l} \lambda_i(c)(\vec{c}_{i,T} - \vec{w}_{srv})}{\sum_{i=0}^{l} \lambda_i(c)},$$

where w represents the current word, c represents the context word of w, $\vec{w}$ represents the word vector of w, $\vec{c}$ represents the word vector of c, $\vec{w}_{i,T}$ and $\vec{c}_{i,T}$ represent an iterative update result on an $i^{th}$ worker computer, $\lambda_i(w)$ represents a quantity of occurrences of w on the $i^{th}$ worker computer, and $\vec{w}_{srv}$ represents $\vec{w}$ stored by a respective server before the training.

Based on a same idea, an embodiment of the present application further provides a cluster-based word vector processing device corresponding to FIG. 2. The device belongs to a cluster, and includes at least one processor and a memory in communication connection with the at least one processor. The memory stores an instruction executable by the at least one processor to cause the at least one processor to: obtain a word and at least one context word of the word that are extracted from a language corpus; obtain word vectors for the word and the at least one context word of the word; train the word vectors according to the word and the at least one context word of the word; and update word vectors of same words according to one or more respective training results of the word vectors of the same words.

Based on a same idea, an embodiment of the present application further provides a non-transitory computer storage medium corresponding to FIG. 2. The non-transitory computer storage medium stores computer executable instructions to cause one or more processors to perform operations including: obtaining a word and at least one context word of the word that are extracted from a language corpus; obtaining word vectors for the word and the at least one context word of the word to generate training results; and training the word vectors according to the word and the at least one context word of the word; and updating word vectors of same words according to one or more respective training results of the word vectors of the same words.

Embodiments of this specification are described above. Other embodiments fall within the scope of the appended claims. In some embodiments, the actions or operations recorded in the claims may be performed in sequences different from those in the embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

The embodiments of this specification are all described in a progressive manner, for same or similar parts in the embodiments, refer to these embodiments, and descriptions of each embodiment focus on a difference from other embodiments. Especially, an apparatus embodiment, a device embodiment, or a non-transitory computer storage medium embodiment is basically similar to a method embodiment, and therefore is described briefly; for related parts, refer to partial descriptions in the method embodiment.

The apparatus, the device, and the non-transitory computer storage medium provided in the embodiments of this specification correspond to the method, so that the apparatus, the device, and the non-transitory computer storage medium also have beneficial technical effects similar to those of the corresponding method. Since the beneficial technical effects of the method have been described in detail above, the beneficial technical effects of the corresponding apparatus, device, and non-transitory computer storage medium are not described herein again.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, during implementation of this specification, the function of the units may be implemented in a same piece of or multiple pieces of software and/or hardware.

A person skilled in the art should understand that the embodiments of this specification may be provided as a method, a system, or a computer program product. Therefore, the embodiments of this specification may use a form of hardware only embodiments, software only embodiments, or embodiments with a combination of software and hardware. Moreover, the embodiments of this specification may use a form of a computer program product that is implemented on one or more computer-usable storage media (including but not limited to a disk memory, a CD-ROM, an optical memory, and the like) that include computer-usable program code.

This specification is described with reference to the flowchart and/or block diagram of the method, device (system), and computer program product of the embodiments of this specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include a form such as a persistent memory, a random-access memory (RAM) and/or a non-transitory memory of computer readable media, for example, a read-only memory (ROM) or a flash memory (RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

This specification can be described in the general context of computer-executable instructions executed by a computer, for example, a program module. Generally, the program module includes a routine, a program, an object, a component, a data structure, and the like for executing a particular task or implementing a particular abstract data type. This specification may also be practiced in distributed computing environments in which tasks are performed by remote processing devices that are connected by using a communications network. In a distributed computing environment, the program module may be located in both local and remote computer storage media including storage devices.

The embodiments of this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of this specification and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A cluster-based word vector processing method to be performed at a cluster comprising a plurality of worker computers, the method comprising operations performed by each of the worker computers:
obtaining a word and at least one context word of the word that are extracted from a respective portion of a corpus through distributed reading;

creating a word pair according to the respective portion of the corpus, wherein the word pair comprises the word and a context word of the at least one context word;
obtaining word vectors for the word and at least one context word;
training the word vectors according to one or more of a designated loss function, a designated negative sample word, or the created word pair to generate training results, by:
traversing the corpus to obtain current words in the corpus; and
calculating a gradient according to one or more of the designated loss function, the designated negative sample word, or the created word pair, and iteratively updating word vectors of the current words and context words of the current words according to the following formulas:

$$\vec{w}_{i,t+1} = \vec{w}_{i,t} + g\vec{c}_{i,t}, w \in B_{i,k} \text{ and}$$

$$\vec{c}_{i,t+1} = \vec{c}_{i,t} + g\vec{w}_{i,t}, c \in \Gamma(w),$$

wherein $$g = \alpha(y - \sigma(\vec{w} \cdot \vec{c})), y = \begin{cases} 1, \{w, c\} \\ 0, \{w, c'\} \end{cases},$$

w represents a current word, c represents a context word of w, c' represents a negative sample word, $\vec{w}$ represents a word vector of w, $\vec{c}$ represents a word vector of c, $\vec{w}_{i,t}$ and $\vec{c}_{i,t}$ represent a $i^{th}$ update on an $i^{th}$ worker computer, $B_{i,k}$ represents a $k^{th}$ corpus on the $i^{th}$ worker computer, $\Gamma(w)$ represents a context word set of w, α represents a learning rate, and σ is a sigmoid function; and
forwarding to a server cluster the training results to enable the server cluster to update the word vectors of the word and at least one context word based on the training results.

2. The method according to claim 1, wherein the server cluster comprises a plurality of servers, and wherein the obtaining a word and at least one context word of the word that are extracted from a respective portion of a corpus through distributed reading comprises:
obtaining a word set and a context word set through extraction according to the created word pair; and
obtaining word vectors for words included in the word set and the context word set from one of the servers.

3. The method according to claim 1, wherein the iteratively updating word vectors of the current words and context words of the current words comprises:
iteratively updating, by one or more threads on a respective worker computer, the word vectors of the current words and context words of the current words using asynchronous calculation without locking.

4. The method according to claim 2, wherein one of the servers is configured to perform:
obtaining training results with respect to the word vectors of the same words from one or more of the worker computers;
performing average calculation according to the training results and the word vectors of the same words that are stored before the training, to obtain vector increment values; and updating the word vectors of the same words according to the vector increment values.

5. The method according to claim 4, wherein the performing average calculation according to the training results and the word vectors of the same words that are stored before the training, to obtain vector increment values comprises:
obtaining the vector increment values through calculation according to the following formulas:

$$\Delta(\vec{w}) = \frac{\sum_{i=0}^{l} \lambda_i(w)(\vec{w}_{i,T} - \vec{w}_{srv})}{\sum_{i=0}^{l} \lambda_i(w)} \text{ and}$$

$$\Delta(\vec{c}) = \frac{\sum_{i=0}^{l} \lambda_i(c)(\vec{c}_{i,T} - \vec{w}_{srv})}{\sum_{i=0}^{l} \lambda_i(c)},$$

wherein w represents a current word, c represents a context word of w, $\vec{w}$ represents a word vector of w, $\vec{c}$ represents a word vector of c, $\vec{w}_{i,T}$ and $\vec{c}_{i,T}$ represent an iterative update result on an $i^{th}$ worker computer, $\lambda_i(w)$ represents a quantity of occurrences of w on the $i^{th}$ worker computer, and $\vec{w}_{srv}$ represents $\vec{w}$ stored by a respective server before the training.

6. A cluster comprising a server cluster and a worker-computer cluster including a plurality of worker computers, wherein each of the worker computers is configured to perform operations including:
obtaining a word and at least one context word of the word that are extracted from a respective portion of a corpus through distributed reading;
creating a word pair according to the respective portion of the corpus, wherein the word pair comprises the word and a context word of the at least one context word;
obtaining word vectors for the word and the at least one context word;
training the word vectors according to one or more of a designated loss function, a designated negative sample word, or the created word pair to generate training results, by:
traversing the corpus to obtain current words in the corpus; and
calculating a gradient according to one or more of the designated loss function, the designated negative sample word, or the created word pair, and iteratively updating word vectors of the current words and context words of the current words according to the following formulas:

$$\vec{w}_{i,t+1} = \vec{w}_{i,t} + g\vec{c}_{i,t}, w \in B_{i,k} \text{ and}$$

$$\vec{c}_{i,t+1} = \vec{c}_{i,t} + g\vec{w}_{i,t}, c \in \Gamma(w),$$

wherein $$g = \alpha(y - \sigma(\vec{w} \cdot \vec{c})), y = \begin{cases} 1, \{w, c\} \\ 0, \{w, c'\} \end{cases},$$

w represents a current word, c represents a context word of w, c' represents a negative sample word, $\vec{w}$ represents a word vector of w, $\vec{c}$ represents a word vector of c, $\vec{w}_{i,t}$ and $\vec{c}_{i,t}$ represent a $i^{th}$ update on an $i^{th}$ worker computer, $B_{i,k}$ represents a $k^{th}$ corpus on the $i^{th}$ worker computer, $\Gamma(w)$ represents a context word set of w, α represents a learning rate, and σ is a sigmoid function; and forwarding to the server cluster the training results to enable the server cluster to update the word vectors for the word and the at least one context word based on the training results.

7. The cluster according to claim 6, wherein the server cluster comprises a plurality of servers, and wherein the obtaining a word and at least one context word of the word that are extracted from a respective portion of a corpus through distributed reading comprises:
obtaining a word set and a context word set through extraction according to the created word pair; and
obtaining word vectors for words included in the word set and the context word set from one of the servers.

8. The cluster according to claim 6, wherein the iteratively updating word vectors of the current words and context words of the current words comprises:
iteratively updating, by one or more threads on a respective worker computer, the word vectors of the current words and context words of the current words using asynchronous calculation without locking.

9. The cluster according to claim 7, wherein one of the servers is configured to perform:
obtaining training results with respect to the word vectors of the same words from one or more the worker computers;
performing average calculation according to the training results and the word vectors of the same words that are stored before the training, to obtain vector increment values; and
updating the word vectors of the same words according to the vector increment values.

10. The cluster according to claim 9, wherein the performing average calculation according to the training results and the word vectors of the same words that are stored before the training, to obtain vector increment values comprises:
obtaining the vector increment values through calculation according to the following formulas:

$$\Delta(\vec{w}) = \frac{\sum_{i=0}^{I} \lambda_i(w)(\vec{w}_{i,T} - \vec{w}_{srv})}{\sum_{i=0}^{I} \lambda_i(w)} \text{ and}$$

$$\Delta(\vec{c}) = \frac{\sum_{i=0}^{I} \lambda_i(c)(\vec{c}_{i,T} - \vec{w}_{srv})}{\sum_{i=0}^{I} \lambda_i(c)},$$

wherein w represents a current word, c represents a context word of w, $\vec{w}$ represents a word vector of w, $\vec{c}$ represents a word vector of c, $\vec{w}_{i,T}$ and $\vec{c}_{i,T}$ represent an iterative update result on an $i^{th}$ worker computer, $\lambda_i(w)$ represents a quantity of occurrences of w on the $i^{th}$ worker computer, and $\vec{w}_{srv}$ represents $\vec{w}$ stored by a respective server before the training.

11. A non-transitory computer-readable storage medium storing instructions executable by one or more processors to cause the one or more processors to perform, at a cluster comprising a worker computer cluster including a plurality of worker computers and a server cluster, operations at each of worker computers:
obtaining a word and at least one context word of the word that are extracted from a respective portion of a corpus through distributed reading;
creating a word pair according to the respective portion of the corpus, wherein the word pair comprises the word and a context word of the at least one context word;
obtaining word vectors for the word and the at least one context word;
training the word vectors according to one or more of a designated loss function, a designated negative sample word, or the created word pair to generate training results, by:
traversing the corpus to obtain current words in the corpus; and
calculating a gradient according to one or more of the designated loss function, the designated negative sample word, or the created word pair, and iteratively updating word vectors of the current words and context words of the current words according to the following formulas:

$\vec{w}_{i,t+1} = \vec{w}_{i,t} + g\vec{c}_{i,t}, w \in B_{i,k}$ and $\vec{c}_{i,t+1} = \vec{c}_{i,t} + g\vec{w}_{i,t}, c \in \Gamma(w),$ wherein $$g = \alpha(y - \sigma(\vec{w} \cdot \vec{c})), y = \begin{cases} 1, \{w, c\} \\ 0, \{w, c'\} \end{cases},$$

w represents a current word, c represents a context word of w, c' represents a negative sample word, $\vec{w}$ represents a word vector of w, $\vec{c}$ represents a word vector of c, $\vec{w}_{i,t}$ and $\vec{c}_{i,t}$ represent a $i^{th}$ update on an $i^{th}$ worker computer, $B_{i,k}$ represents a $k^{th}$ corpus on the $i^{th}$ worker computer, $\Gamma(w)$ represents a context word set of w, α represents a learning rate, and σ is a sigmoid function; and forwarding to the server cluster the training results to enable the server cluster to update the word vectors for the word and the at least one context word based on the training results.

12. The non-transitory computer-readable storage medium according to claim 11, wherein the server cluster comprises a plurality of servers, and wherein the obtaining a word and at least one context word of the word that are extracted from a respective portion of a corpus through distributed reading comprises:
obtaining a word set and a context word set through extraction according to the created word pair; and
obtaining word vectors for words included in the word set and the context word set from one of the servers.

13. The non-transitory computer-readable storage medium according to claim 11, wherein the iteratively updating word vectors of the current words and context words of the current words comprises:
iteratively updating, by one or more threads on a respective worker computer, the word vectors of the current words and context words of the current words using asynchronous calculation without locking.

14. The non-transitory computer-readable storage medium according to claim 12, wherein one of the servers is configured to perform:

obtaining training results with respect to the word vectors of the same words from one or more of the worker computers;

performing average calculation according to the training results and the word vectors of the same words that are stored before the training, to obtain vector increment values; and updating the word vectors of the same words according to the vector increment values.

15. The non-transitory computer-readable storage medium according to claim 14, wherein the performing average calculation according to the training results and the word vectors of the same words that are stored before the training, to obtain vector increment values comprises:

obtaining the vector increment values through calculation according to the following formulas:

$$\Delta(\vec{w}) = \frac{\sum_{i=0}^{I} \lambda_i(w)(\vec{w}_{i,T} - \vec{w}_{srv})}{\sum_{i=0}^{I} \lambda_i(w)} \text{ and}$$

$$\Delta(\vec{c}) = \frac{\sum_{i=0}^{I} \lambda_i(c)(\vec{c}_{i,T} - \vec{w}_{srv})}{\sum_{i=0}^{I} \lambda_i(c)},$$

wherein w represents a current word, c represents a context word of w, $\vec{w}$ represents a word vector of w, $\vec{c}$ represents a word vector of c, $\vec{w}_{i,T}$ and $\vec{c}_{i,T}$ represent an iterative update result on an $i^{th}$ worker computer, $\lambda_i(w)$ represents a quantity of occurrences of w on the $i^{th}$ worker computer, and $\vec{w}_{srv}$ represents $\vec{w}$ stored by a respective server before the training.

* * * * *